US009332767B2

(12) United States Patent
Pickford

(10) Patent No.: US 9,332,767 B2
(45) Date of Patent: May 10, 2016

(54) MICROWAVEABLE BATTER

(71) Applicant: Crisp Sensation Holding S.A., Geneva (CH)

(72) Inventor: Keith Graham Pickford, Manchester (GB)

(73) Assignee: Crisp Sensation Holding S.A., Geneva (CH)

( * ) Notice: Subject to any disclaimer, the term of this patent is extended or adjusted under 35 U.S.C. 154(b) by 0 days.

(21) Appl. No.: 14/032,881

(22) Filed: Sep. 20, 2013

(65) Prior Publication Data

US 2014/0093615 A1   Apr. 3, 2014

Related U.S. Application Data

(63) Continuation of application No. 12/764,428, filed on Apr. 21, 2010, now abandoned.

(30) Foreign Application Priority Data

Jan. 15, 2010   (GB) .................................. 1000747.6

(51) Int. Cl.
| A21D 10/00 | (2006.01) |
| A21D 10/04 | (2006.01) |
| A23L 1/025 | (2006.01) |
| A23L 1/00 | (2006.01) |
| A23L 1/03 | (2006.01) |
| A23L 1/05 | (2006.01) |
| A23L 1/0522 | (2006.01) |
| A23L 1/054 | (2006.01) |
| A23L 1/10 | (2006.01) |
| A23L 1/315 | (2006.01) |
| A23L 1/317 | (2006.01) |
| A23L 1/325 | (2006.01) |

(52) U.S. Cl.
CPC .................. *A21D 10/04* (2013.01); *A23L 1/005* (2013.01); *A23L 1/0255* (2013.01); *A23L 1/034* (2013.01); *A23L 1/05* (2013.01); *A23L 1/0522* (2013.01); *A23L 1/0541* (2013.01); *A23L 1/1041* (2013.01); *A23L 1/317* (2013.01); *A23L 1/3157* (2013.01); *A23L 1/3172* (2013.01); *A23L 1/3255* (2013.01); *A23L 1/3257* (2013.01); *A23V 2002/00* (2013.01)

(58) Field of Classification Search
CPC ... A23L 1/0255; A23L 1/0128; A23L 1/3257; A23L 1/0052; A23L 1/0522; A23L 1/3255; A23L 1/005; A23L 1/034; A23L 1/05; A23V 2002/00; A21D 10/00
USPC ............. 426/64, 549, 615, 629, 94, 234, 237, 426/243
See application file for complete search history.

(56) References Cited

U.S. PATENT DOCUMENTS

| 2,446,175 | A | 8/1948 | Gerber |
| 3,067,921 | A | 12/1962 | Reifers |
| 3,052,545 | A | 9/1963 | Ducharme et al. |
| 3,208,851 | A | 9/1965 | Antinori et al. |
| 3,251,531 | A | 5/1966 | Hook et al. |
| 3,399,062 | A | 8/1968 | Willard, Jr. et al. |
| 3,486,904 | A | 12/1969 | Ziegler |
| 3,586,512 | A | 6/1971 | Mancuso et al. |
| 3,597,227 | A | 8/1971 | Murray et al. |
| 3,619,208 | A | 11/1971 | Bahoshy et al. |
| 3,656,969 | A | 4/1972 | Horn |
| RE27,531 | E | 12/1972 | Murray et al. |
| 3,751,268 | A | 8/1973 | van Patten et al. |
| 3,857,976 | A | 12/1974 | Szymanski et al. |
| 3,899,602 | A | 8/1975 | Rutenberg et al. |
| 3,904,429 | A | 9/1975 | Eastman et al. |
| 3,904,601 | A | 9/1975 | Tessler et al. |
| 3,915,532 | A | 10/1975 | Ashton |
| 3,956,515 | A | 5/1976 | Moore et al. |
| 3,969,340 | A | 7/1976 | Tessler et al. |
| 3,970,767 | A | 7/1976 | Tessler et al. |
| 4,068,009 | A | 1/1978 | Rispoli et al. |
| 4,192,900 | A | 3/1980 | Cheng |
| 4,208,442 | A | 6/1980 | Evans et al. |
| 4,218,485 | A | 8/1980 | Lee et al. |
| 4,308,286 | A | 12/1981 | Anstett et al. |
| 4,342,788 | A | 8/1982 | Clatfelter |
| 4,364,961 | A | 12/1982 | Darley et al. |
| 4,393,088 | A | 7/1983 | Matsusaka |

(Continued)

FOREIGN PATENT DOCUMENTS

| CA | 980164 | 12/1975 |
| DE | 2220528 | 12/1972 |

(Continued)

OTHER PUBLICATIONS

Altschul, A.M., "Low-calorie foods handbook", Georgetown University School of Medicine, Marcel Dekker, Inc., Jul. 29, 1993, pp. 1-10.
Albert, A. et al., "Adhesion in fried battered nuggets: Performance of different hydrocolloids as predusts using three cooking procedures", Food Hydrocolloids 23 (2009) 1443-1448.
Henderson, A., "Cellulose ethers—the role of thermal gelation", Dow Chemical Europe, CH-8810 Horgen, Switzerland, 1988, pp. 265-275.
WO application No. PCT/GB96/01685, International Search Report mailed Oct. 29, 1996.
WO application No. PCT/GB97/00924, International Search Report mailed Jul. 30, 1997.

(Continued)

*Primary Examiner* — Jyoti Chawla
(74) *Attorney, Agent, or Firm* — Price Heneveld LLP

(57) ABSTRACT

A microwaveable cookable or reheatable foodstuff coating composition comprising an aqueous mixture including:
 a) starch
 b) a flour component comprising gluten free flour and maize flour
 c) a gelling agent
 d) an enzyme additive comprising alpha amylase; and
 e) optional further ingredients.

16 Claims, No Drawings

(56) References Cited

U.S. PATENT DOCUMENTS

| | | |
|---|---|---|
| 4,415,599 A | 11/1983 | Bos |
| 4,423,078 A | 12/1983 | Darley et al. |
| 4,427,706 A | 1/1984 | El-Hag |
| 4,440,793 A | 4/1984 | Seki |
| 4,568,550 A | 2/1986 | Fulger et al. |
| 4,568,555 A | 2/1986 | Spanier |
| 4,588,600 A | 5/1986 | Suderman |
| 4,597,974 A | 7/1986 | Fonteneau et al. |
| 4,609,557 A | 9/1986 | Mao et al. |
| 4,609,558 A | 9/1986 | Giacone et al. |
| 4,623,552 A | 11/1986 | Rapp |
| 4,767,637 A | 8/1988 | Ek |
| 4,778,684 A | 10/1988 | D'Amico et al. |
| 4,864,089 A | 9/1989 | Tighe et al. |
| 4,877,628 A | 10/1989 | Stypula |
| 4,908,487 A | 3/1990 | Sarnoff et al. |
| 4,913,918 A | 4/1990 | Stypula |
| 4,915,970 A | 4/1990 | Coffey |
| 4,943,438 A | 7/1990 | Rosenthal |
| 4,948,608 A | 8/1990 | Stypula et al. |
| 4,978,541 A | 12/1990 | Stypula et al. |
| 5,049,711 A | 9/1991 | August |
| 5,057,329 A | 10/1991 | Stypula et al. |
| 5,088,179 A | 2/1992 | Gibbon |
| 5,093,176 A | 3/1992 | Pribonic et al. |
| 5,175,010 A | 12/1992 | Roig et al. |
| 5,202,138 A | 4/1993 | Stypula et al. |
| H1229 H | 9/1993 | McGinley et al. |
| 5,266,340 A | 11/1993 | Samson et al. |
| 5,281,432 A * | 1/1994 | Zallie et al. .................. 426/549 |
| 5,308,636 A | 5/1994 | Tye et al. |
| 5,310,977 A | 5/1994 | Stenkamp et al. |
| 5,310,980 A | 5/1994 | Beckett et al. |
| 5,321,900 A | 6/1994 | Meyer |
| 5,350,585 A | 9/1994 | Sunderland |
| 5,423,477 A | 6/1995 | Valdman et al. |
| 5,431,944 A * | 7/1995 | Melvej .......................... 426/552 |
| 5,433,966 A | 7/1995 | Wolt et al. |
| 5,492,707 A | 2/1996 | Chalupa et al. |
| 5,523,102 A | 6/1996 | Morasch |
| 5,565,132 A | 10/1996 | Salyer |
| 5,601,861 A | 2/1997 | Gerrish et al. |
| 5,736,178 A | 4/1998 | Cook et al. |
| 6,097,017 A | 8/2000 | Pickford |
| 6,214,403 B1 | 4/2001 | Broberg et al. |
| 6,261,625 B1 | 7/2001 | Pickford |
| 6,287,621 B1 | 9/2001 | Lacourse et al. |
| 6,288,179 B1 | 9/2001 | Baur et al. |
| 6,326,599 B1 | 12/2001 | Pickford |
| 6,399,130 B2 | 6/2002 | Parker |
| 6,413,562 B2 | 7/2002 | Conforti et al. |
| 6,458,404 B1 | 10/2002 | Adachi |
| 6,503,546 B1 | 1/2003 | Ferrari-Philippe et al. |
| 6,613,370 B1 | 9/2003 | Pickford |
| 6,620,447 B1 | 9/2003 | Paukkunen et al. |
| 7,147,885 B2 | 12/2006 | Asano et al. |
| 2001/0014363 A1 | 8/2001 | Parker |
| 2001/0024672 A1 | 9/2001 | Kondou et al. |
| 2001/0055641 A1 | 12/2001 | Conforti et al. |
| 2002/0039215 A1 | 4/2002 | Adachi |
| 2002/0119226 A1 | 8/2002 | Conforti et al. |
| 2002/0192332 A1 | 12/2002 | Pickford |
| 2003/0147998 A1 | 8/2003 | Geng et al. |
| 2003/0198711 A1 | 10/2003 | Pickford |
| 2004/0213883 A1 | 10/2004 | Sadek et al. |
| 2005/0169099 A1 | 8/2005 | Sprinkle |
| 2006/0053650 A1 | 3/2006 | Manak et al. |
| 2006/0286240 A1 | 12/2006 | Roosjen |
| 2011/0091612 A1 | 4/2011 | Pickford |
| 2011/0177200 A1 | 7/2011 | Pickford |
| 2011/0177210 A1 | 7/2011 | Pickford |
| 2011/0177211 A1 | 7/2011 | Pickford |
| 2012/0196004 A1 | 8/2012 | Pickford |
| 2012/0196005 A1 | 8/2012 | Pickford |
| 2012/0288592 A1 | 11/2012 | Pickford |
| 2013/0156925 A1 | 6/2013 | Pickford |

FOREIGN PATENT DOCUMENTS

| | | |
|---|---|---|
| DE | 2338180 | 2/1975 |
| EP | 17338 | 10/1980 |
| EP | 109226 | 5/1984 |
| EP | 155760 | 9/1985 |
| EP | 327332 | 8/1989 |
| EP | 344726 | 12/1989 |
| EP | 392119 | 10/1990 |
| EP | 510320 | 2/1992 |
| EP | 273475 | 3/1992 |
| EP | 648433 | 10/1994 |
| EP | 1929887 | 6/2008 |
| EP | 2207434 | 8/2011 |
| EP | 2359697 | 8/2011 |
| EP | 2374361 | 10/2011 |
| EP | 2481294 | 8/2012 |
| EP | 2481295 | 8/2012 |
| FR | 2337534 | 8/1977 |
| FR | 2343668 | 10/1997 |
| GB | 1419455 | 12/1975 |
| GB | 2226220 | 11/1988 |
| JP | 57-159451 | 10/1982 |
| JP | 01-168242 | 7/1989 |
| WO | 85/01188 | 3/1985 |
| WO | 88/06007 | 8/1988 |
| WO | 88/06847 | 9/1988 |
| WO | 89/08549 | 9/1989 |
| WO | 92/01384 | 2/1992 |
| WO | 93/03634 | 3/1993 |
| WO | 93/06752 | 4/1993 |
| WO | 93/14995 | 8/1993 |
| WO | 94/13160 | 6/1994 |
| WO | 94/19917 | 9/1994 |
| WO | 94/27887 | 12/1994 |
| WO | 95/07629 | 3/1995 |
| WO | 95/23523 | 9/1995 |
| WO | 95/24110 | 9/1995 |
| WO | 95/30344 | 11/1995 |
| WO | WO 9530344 A1 * | 11/1995 |
| WO | 96/02149 | 2/1996 |
| WO | 96/22228 | 7/1996 |
| WO | 96/32026 | 10/1996 |
| WO | 96/38054 | 12/1996 |
| WO | 97/03572 | 2/1997 |
| WO | 97/29653 | 8/1997 |
| WO | 98/08399 | 3/1998 |
| WO | 99/44439 | 9/1999 |
| WO | 2005/112664 | 12/2005 |
| WO | 2006/030333 | 3/2006 |
| WO | 2006/082804 | 8/2006 |
| WO | 2008/078997 | 7/2008 |
| WO | 2010/001101 | 1/2010 |

OTHER PUBLICATIONS

WO application No. PCT/GB99,00564, International Search Report mailed Jun. 29, 1999.
WO application No. PCT/GB92/01559, International Search Report mailed Dec. 30, 1992.
WO application No. PCT/GB95/00958, International Search Report mailed Aug. 22, 1995.
WO patent application No. PCT/GB2011/050060, International Search Report and Written Opinion mailed May 23, 2011.
WO patent application No. PCT/GB2011/050057, International Search Report mailed May 23, 2011.
WO patent application No. PCT/GB2011/050055, International Search Report and Written Opinion mailed May 20, 2011.
U.S. Appl. No. 09/000,319, Office Action mailed Feb. 3, 1999.
U.S. Appl. No. 09/000,319, Office Action mailed Mar. 27, 2000.
U.S. Appl. No. 09/381,848, Office Action mailed Sep. 26, 2000.
U.S. Appl. No. 09/381,848, Office Action mailed May 8, 2001.
U.S. Appl. No. 09/646,068, Office Action mailed May 8, 2002.

(56) References Cited

OTHER PUBLICATIONS

U.S. Appl. No. 09/646,068, Office Action mailed Feb. 4, 2003.
EP patent application No. 11152421.1, Extended Search Report mailed Jul. 5, 2011.
EP patent application No. 11152415.3, Extended Search Report mailed Jul. 5, 2011.
U.S. Appl. No. 13/015,486, "Production of microwaveable coated food products", Keith Graham Pickford, filed Jan. 27, 2011.
U.S. Appl. No. 13/015,491, "Microwaveable coated food product, and method and apparatus for the manufacture thereof", Keith Graham Pickford, filed Jan. 27, 2011.
U.S. Appl. No. 13/107,814, "Microwaveable batter", Keith Graham Pickford, filed May 13, 2011.
U.S. Appl. No. 13/331,900, "Crumb Manufacture", Pickford et al., filed Dec. 20, 2011.
U.S. Appl. No. 12/764,428, Office Action mailed Jan. 5, 2012.
U.S. Appl. No. 12/764,428, Office Action mailed Jun. 21, 2012.
U.S. Appl. No. 12/764,407, Office Action mailed Oct. 5, 2012.
U.S. Appl. No. 12/764,421, Office Action mailed Oct. 9, 2012.
U.S. Appl. No. 13/015,486, Office Action mailed Oct. 12, 2012.
FoodSafety.gov, "Minimum Cooking Temperatures," downloaded from http://www.foodsafety.gov/keep/charts/mintemp.html on Sep. 30, 2012.
Kuntz, Lynn A., "The Great Cover-Up: Batters, Breadings & Coatings," downloaded from http://www.foodproductdesign.com on Sep. 28, 2012.
U.S. Appl. No. 13/015,491, Office Action mailed Oct. 15, 2012.
WO patent application No. PCT/GB2009/001617, Search Report and Written Opinion mailed Jul. 1, 2008.
EP patent application No. 09772781.2, Communication under Rule 71(3) EPC, intent to grant, mailed Mar. 14, 2011.
U.S. Appl. No. 13/331,900, Office Action mailed Dec. 7, 2012.
Clextral Press Release: New drying technology provides optimal drying for complex products and reduces energy expense, Clextral—a division of Groupe Legris Industries, Jun. 2009.
Clextral Rotante Evolum dryer—new generation for sustainable development, Clextral—a division of Groupe Legris Industries, Jun. 2009.
EP patent application No. 1119483.6, Extended European Search Report mailed Aug. 10, 2012.
Perten, Harald, "Application of the falling number method for evaluating alpha-amylase activity," Cereal Chemistry, vol. 41, May 1964, pp. 127-140.
English translation of Paris GDS Moulins FR 2,458,227, Jan. 1981.
Edwards, W.P., "The Science of Bakery Products," Chapter 7—Raw Materials, The Royal Society of Chemistry, 2007.
English translation of Wiedmann et al., EP 0510320A1, Oct. 1992, downloaded from http://translationportal.epo.org on Jan. 25, 2013.
"Criteria for Judging Quality," published Jun. 20, 2008, downloaded from http://web.archive,org/web/20080620034754http://www.theartisan.net/flour_criteria_judging.htm on Jan. 25, 2013.
English translation of RU 2277438, Rye-wheat bread and its proI3vodstva, Berestnev et al., Jun. 10, 2006.
U.S. Appl. No. 13/015,486, Office Action mailed Feb. 19, 2013.
U.S. Appl. No. 12/764,428, Office Action mailed Mar. 22, 2013.
U.S. Appl. No. 12/764,421, Office Action mailed Apr. 1, 2013.
U.S. Appl. No. 12/764,407, Office Action mailed Apr. 5, 2013.
U.S. Appl. No. 13/331,900, Office Action mailed Apr. 10, 2013
EP patent application No. 12178463, European Search Report mailed Jan. 22, 2013.
WO patent application No. PCT/EP2012/076015, International Search Report and Written Opinion mailed May 7, 2013.
U.S. Appl. No. 13/015,491, Office Action mailed Jun. 5, 2013.
U.S. Appl. No. 13/107,814, Office Action mailed Jun. 21, 2013.
U.S. Appl. No. 12/669,953, Notice of Allowance mailed Jul. 25, 2013.
EP patent application No. 11163536.3, Communication under Rule 71(3) EPC, Intent to Grant, mailed May 30, 2013.
U.S. Appl. No. 12/764,407, Office Action mailed Oct. 25, 2013.
U.S. Appl. No. 13/015,491, Office Action mailed Nov. 8, 2013.
U.S. Appl. No. 14/105,847, "Stabilized Cheese Products," van der Kolk et al., filed Dec. 13, 2013.
U.S. Appl. No. 13/015,486, Office Action mailed Jan. 6, 2014.
U.S. Appl. No. 12/764,407, Notice of Allowance mailed Feb. 12, 2014.
U.S. Appl. No. 13/107,814, Office Action mailed Feb. 13, 2014.

* cited by examiner

MICROWAVEABLE BATTER

CROSS REFERENCE TO RELATED APPLICATION

This application is a continuation of prior application Ser. No. 12/764,428 filed on Apr. 21, 2010, now abandoned, the disclosure of which is incorporated by reference herein in its entirety.

This invention relates to a coating for foodstuffs, which is cookable or reheatable using a microwave oven, combination microwave oven or by radiant heat by any means. The invention relates particularly but not exclusively to microwaveable cookable or reheatable batters or breaded coatings.

Microwave ovens are commonly used for heating food products, which have been pre-prepared by a foodstuff manufacturer. Pre-prepared products include batter coated foodstuffs in which the basic foodstuff, for example meat, fish, poultry, vegetables, fruit or dairy products, has been coated in a batter optionally coated with crumbs, deep fried and then frozen for supply to a consumer.

Heating in a microwaveable oven may complete the cooking process or simply reheat a previously cooked product. Microwave cookable coatings have particular requirements. Microwave energy penetrates throughout a food product. Steam released from the core of a food product can cause the batter coating to become soggy. This impairs the texture and taste of the product.

WO 88/06007 disclosed a batter composition and method of preparation wherein the foodstuff is pre-dusted with high amylose starch and methylcellulose. The batter included high enzyme soya flour. WO93/003634 disclosed an improved pre-dust composition including a mixture of particulate starch and particulate cellulose gum, which gelled on heating in the presence of moisture. Such a pre-dust can form a dense, high viscosity barrier to absorption of oil and migration of moisture. The barrier also provides a stable environment for any seasoning and can enhance bonding with the batter. Although high enzyme soya flours generally afford acceptable products, variations in their enzyme content have given rise to inconsistent and occasionally undesirable flavours. WO96/032026 disclosed a microwaveable batter comprising starch, flour, a gelling agent, an enzyme, additive and further ingredients. An exemplified formulation comprised genetically modified high amylose maize flour.

The present invention provides a batter coating having improved properties during manufacture, storage and upon consumption, and related compositions and methods.

Batter or breaded coatings in accordance with this invention are preferably cookable or reheatable using conventional ovens or fryers in addition to microwave ovens and combination microwave ovens.

According to a first aspect of the present invention, a microwave cookable or reheatable foodstuff coating composition comprises an aqueous mixture including the following ingredients:
 a) starch;
 b) a flour component comprising a mixture of two or more gluten free flours including maize flour;
 c) a gelling agent;
 d) an enzyme additive comprising alpha amylase; and
 e) optional further ingredients.

The amount of the starch component, excluding any starch which may be present in the flour, may comprise about 20-35% more preferably about 28.8% by weight of the dry ingredients.

The starch may comprise high amylose starch, preferably maize starch, for example as manufactured under trademark HYLON 7 of National Starch. An amylose content of 60% to 80%, preferably 70%, is preferred. Use of a hot swell starch is preferred.

The flour component may comprise about 40% to about 55% preferably about 48.2% by weight of the dry ingredients.

The weight ratio of flour to starch components, that is non-flour starch, may be in the range of about 36% to about 87%, preferably about 50% to about 63%.

The flour component comprises a mixture of at least one first gluten free flour, preferably soya flour for example HiSoy supplied by Bake Mark UK manufactured from soya beans of Canadian origin and maize flour for example French maize flour YF36 manufactured by Smiths Flour Mills. Maize flour is gluten free. Gluten free flour referred to in this specification may contain less than 1% gluten, preferably less than 0.1% gluten. In particularly preferred flours, gluten is completely absent.

The flour component may contain from about 25% to about 70% of maize flour and from about 30% to about 75% of one or more other gluten free flours.

The flour mixture preferably has a fat content of about 15-33%, more preferably about 20-28%, especially about 24%. Full fat soya flour may be employed.

A reducing sugar or mixture of reducing sugars may be used to give colour to the cooked coating. D-xylose is preferred although fructose, maltose or mixtures of these reducing sugars may be used. An amount of about 1-3% preferably about 2% is preferred.

The gelling agent or thickener (referred to for convenience as a gelling agent) is employed in an amount sufficient to stabilise the coating as an emulsion. One or more of the following may be employed: collagen, alginate, xanthan gum, gelatine, guar gum, agar gum, gum arabic, locust bean gum, or carrageenan gum. Use of guar gum or mixtures containing guar gum is preferred. An amount of about 0.5—to about 3% preferably about 1% may be employed. The gelling agent is preferably present in an amount sufficient to give long-term stability, for example to allow the batter to be stored before use.

The further ingredients may include whole egg. An amount of about 10-18%, preferably about 14% may be employed. The egg may comprise dried egg. This may comprise dried whole egg or a blend of egg white and egg yolk.

Glyceryl monostearate may be used as an emulsifier. Alternative emulsifiers may be used. An amount of 1% to 5%, preferably about 2% may be employed.

A phosphate may be employed in an amount of about 0.7 to 3% to adjust the pH for optimum enzyme activity. Monosodium phosphate in an amount of about 1.87% is preferred.

The further ingredients preferably include ammonium bicarbonate used as an aid to formulation. An amount of about 0.7% is preferred.

Glucono-D-lactone may be used as a slow release pH adjuster. An amount of about 0.67% may be employed.

Sodium acid pyrophosphate may be used to regulate pH. An amount of about 0.37% may be employed.

A thickener, for example methylcellulose, Methocel A4M may be used in an amount of about 0.1-1%, preferably about 0.25%.

Use of a coating composition in accordance with the first aspect of this invention confers several advantages. The coating adheres well to a substrate and to subsequently applied crumb. The coating allows escape of moisture during frying but does not give a high a degree of fat pickup from the frying oil. A shell-like coating is formed to give a desirably crisp bite.

The gel, batter and crumb form an integral, consolidated layer after cooking.

The enzyme additive is preferably a concentrated enzyme preparation. Enzyme containing conventional ingredients used in batter, for example high enzyme flours are inconsistent and are not preferred. However, the concentrated enzyme preparation may be blended with a further ingredient such as starch or flour to facilitate mixing into the composition. The enzyme preparation may contain buffers or stabilizers.

Preferred enzyme additives include bacterial amylases, for example, Novamyl BG10000.

The additive preferably contains only the enzymes required for the coating composition. Lipoxygenases or other enzymes, which may be present in commercial high enzyme flours are avoided since these may give rise to adverse flavours.

The viscosity of the coating composition before use is preferably in the range of about 400 to 700 cp, preferably about 550 cp measured using a Brookfield viscometer with a No 3 spindle at 60 rpm.

The freshly mixed composition in the ratio of about 2 parts water and about 1 part batter may have a viscosity about 1500 to 1700 cp preferably about 1600 cp. After mixing in a high shear mixer, the temperature may be raised to 42° C. Following mixing the batter is stored and allowed to ferment. After storage, the mixture is diluted with water to give a final ratio of 2.4 parts of water to 1 part of batter mix to give a viscosity of about 550 cP.

The batter ingredients may be mixed in starter batches in the ratio of 2 parts of water to 1 of batter, and stored overnight, for example, in a chill room. The batter continues to ferment for about 24 hours at a decreasing rate until the temperature of the batch reaches approximately 5° C. The viscosity increases overnight to a value between about 1000 cP and about 1600 cP depending on the batch. The mixer used may be a Silverson batch mixer with a high shear slotted disintegrating head.

A pre-dust or pre-coating may be applied to the substrate before application of the batter composition. A conventional pre-dust may be used but use of an aqueous gel is preferred.

The aqueous gel may comprise, by dry weight:

starch range 28 to 40% thickener range 18 to 30% xanthan gum range 20 to 35% egg albumen range 10 to 25%.

A preferred formulation is:

starch 35% thickener 25% xanthan gum 25% egg albumen 15% by dry weight.

Amounts and quantities referred to in this specification are by weight unless indicated otherwise. Percentages and other proportions are selected from ranges given to total 100%.

The invention is further described by means of example but not in any limitative sense

EXAMPLE 1

Coating Composition

A coating composition was prepared by mixing the following ingredients:

| Ingredient | % |
| --- | --- |
| soya flour (Hisoy) | 29.0 |
| high amylose starch (Hylon 7) | 28.8 |
| maize flour | 19.2 |
| dried whole egg (Henningsen W1) | 14.0 |
| glyceryl monostearate | 02.0 |
| D-xylose | 02.0 |
| monosodium phosphate | 01.9 |
| guar gum | 01.0 |
| ammonium bicarbonate | 00.7 |
| glucono-D-lactone | 00.7 |
| sodium acid pyrophosphate | 00.4 |
| thickener (Methocel A4M) | 00.2 |
| alpha-amylase | 00.1 |
| | 100.0 |

The batter can be mixed in batches using a Silverson DX high shear mixer on a gantry with a slotted disintegrating head. Batches were mixed in the ratio of 25 kilos water to 12.5 kilos dry batter powder in a vat with a diameter of 68 cm. Thereafter, the mix was diluted as required.

In full production the batter ingredients were mixed using two 200 liter stainless steel vessels linked by a pump and an inline Silverson mixer with a high shear slotted disintegrating head. One tank was fitted with a paddle and was filled with water at 15-20° C. The dry ingredients were added to the water and wetted by rotation of the paddle. The second tank was fitted with a cooling jacket and a return pipe to the first vessel. The batter mixture was circulated through the high shear head until a temperature of 42° C. was reached by mechanical heat transfer. External heating may be employed to avoid a tendency to over shear the starch. When 42° C. was reached, the mixing and enzymolyis were complete. The batter was transferred to the second vessel and cooled. A heat exchanger may be used to cool the mixture. After cooling, the batter was pumped into a tempura type batter applicator.

The viscosity in the batter mixture was in the range 550-650 cP as measured by a number 3 spindle at 60 rpm. The batter was found to give a good rate of pickup and a crisp coating after frying.

EXAMPLE 2

General-Purpose Stabiliser

A composition of the following ingredients is used to form a semi-reversible gel

| methylcellulose | 15% |
| --- | --- |
| starch (Thermflo) | 24% |
| egg albumen | 15% |
| xanthan gum | 6% |
| polydextrose | 40% |
| | 100% |

The composition was dissolved in water to produce a solution with a concentration suitable to stabilising the particular substrate in use. This general purpose formula may be modified to increase its efficiency in specific substrates. The above formula may be modified by addition of citric acid (up to 1%) and ascorbic acid (up to 2%) with the polydextrose (Litesse II) being reduced accordingly. Water bonding is improved. Subject to further testing 0.5% of each could be added with corresponding reduction of the weight of polydextrose by 1%.

EXAMPLE 3

Preparation of Stabiliser

The dry powder mix was partially hydrated in a tub and then poured into a bowl chopper. The bowl chopper was then run for two to three minutes until fully hydrated. The mix can be hydrated directly in the bowl chopper if required. Alternatively, the stabiliser may be hydrated using a high shear mixer using a general purpose head.

EXAMPLE 4

Preparation of Meat Mixture

A chicken mixture for chicken dippers or nuggets was prepared with the following composition. The stabiliser of Example 2 was used.

| | |
|---|---|
| chicken emulsion | 20% |
| skin - 3 mm | 18% |
| chicken breast - 10 mm | 50% |
| water | 2% |
| rusk | 2% |
| Stabiliser (powder by dry weight) | 5% |
| seasoning | 3% |
| | 100% |

The chicken breast was chilled to −3° C. and minced using a 10 mm plate. After mincing, the temperature was 0-3° C. Water was added with mixing. A chicken emulsion comprising the following ingredients was added with mixing:

| | |
|---|---|
| chicken skin | 44% |
| water | 44% |
| soya isolate | 11% |
| salt | 1% |
| | 100% |

The stabiliser in accordance to Example 2 was added and mixed thoroughly. Rusk was added with mixing following by seasoning. A colourless, solid flavouring was preferred.

A vacuum was applied to the mixture to consolidate the structure following which the chicken mixture was chilled to −3° C. and formed into shaped particles.

A similar procedure was used for other comminuted meat products. Large particulate cores may be manufactured using a similar method.

EXAMPLE 5

Chicken Mix

| | |
|---|---|
| chicken breast meat (13 mm) | 79% |
| salt | 1% |
| water | 12% |
| stabiliser (Example 2) | 5% |
| inuline and seasoning | 3% |
| | 100% |

EXAMPLE 6

Fish Mix

| | |
|---|---|
| cod fillet blocks partially thawed | 85.9% |
| salt | 0.9% |
| water | 4.6% |
| stabiliser (Example 2) | 4.8% |
| fish binder | 3.9% |
| | 100% |

EXAMPLE 7

Pre-Gel Coating

A conventional pre-dust may be employed, for example as disclosed in WO9632026 the disclosure of which is incorporated herein by reference for all purposes. Use of a pre-dust has a disadvantage of formation of dust clouds. Transfer of a pre-dust to the batter affects the viscosity of the batter during prolonged use. Accordingly, use of a gel pre-coating is preferred. The following mixture was prepared:

| | |
|---|---|
| starch (Thermflo) | 35% |
| thickener (Methocel A4M) | 25% |
| xanthan gum | 25% |
| egg albumen | 15% |
| | 100% |

The mixture was dissolved in water to form a 1% solution using a CFS Scanbrine mixer with paddle agitation. The solution was left to stand for 24 hours to form a fully hydrated gel.

The gel was applied to the substrate particles using a tempura type batter applicator in which the particles were dipped.

A pump is necessary to run the machine but after a short while bubbles form in the pre-gel in the applicator. To prevent this problem food grade anti foaming agents can be used. Polydimethylsiloxane is preferred but calcium alginate, methyl ethyl cellulose, methylphenylpolysiloxane or polyethylene glycol can be used.

EXAMPLE 8

Crumb Application

A crumb was prepared as disclosed in PCT/GB09/001617, published as WO 2010/001101 the disclosure of which is incorporated herein by reference for all purposes.

Following application of the pre-gel a fine crumb was applied with a mesh size less than 1% or described as a dust, using a CFS Crumbmaster breadcrumb applicator.

The coated particles were passed through the batter of Example 1 in a tempura batter applicator.

A 2 mm crumb was applied in a second CFS Crumbmaster breadcrumb applicator with slight pressure from a roller. Particles were passed through a third CFS Crumbmaster breadcrumb applicator to infill with a 1 mm crumb using light pressure from a roller.

EXAMPLE 9

Frying and Cooking

The coated substrate was fried in pure, fresh rapeseed oil for 2 minutes 20 seconds approximately at 180-188° C. The frying time can be varied depending upon the weight and size of the particles. After frying, the core temperature was 74-85° C. A small loss of weight was observed due to loss of water from the substrate but this is mostly compensated for by the uptake of oil.

The invention claimed is:

1. A microwave cookable or reheatable foodstuff coating composition comprising 55-80 weight % water and 20-45 weight % of a mixture comprising by dry weight: an aqueous mixture including:
    a) from about 20%-28.8% high amylose starch by weight of dry ingredients;
    b) 40-55% of a flour component by weight of dry ingredient, said flour component having a fat content of 15% to 33% and which contains 25% of 70% by dry weight of maize flour and 30% to 75% of gluten free full-fat soya flour;
    c) 0.1% to 5% guar gum; and
    d) an enzyme additive comprising alpha amylase.

2. The coating composition as claimed in claim 1, wherein the fat content of the flour component is from about 20% to about 28%.

3. The coating composition of claim 1 wherein the amount of the high amylose starch is 28.8% by weight of dry ingredients and the fat content of the flour component is from about 20% to about 28%.

4. The coating composition of claim 1, wherein the high amylose starch is a hot swell starch.

5. The coating composition of claim 1 wherein the flour mixture has a fat content of about 24%.

6. The coating composition of claim 1 further comprising D-xylose in an amount from about 1% to about 3% by weight of dry ingredients.

7. The coating composition of claim 1, wherein the guar gum is in an amount of about 0.5 to about 3%.

8. The coating composition of claim 1, wherein the aqueous mixture includes about 1% guar gum.

9. The coating composition of claim 1 having a viscosity of from about 380 to about 400 cP.

10. A method of coating a microwave cookable or reheatable foodstuff comprising the steps of:
    applying a pre-coating comprising an aqueous gel comprising:
        starch 28 to 40%;
        thickener 18 to 30%;
        xanthan gum 20 to 35%; and
        egg albumen 10 to 25%; wherein the percentage of ingredients is by dry weight;
    followed by applying the coating of claim 1 to the foodstuff.

11. A microwave cookable or reheatable foodstuff coating composition consisting of an aqueous mixture of:
    a) from about 20-28.8 weight % high amylose starch by weight of dry ingredients;
    b) 40-55% of a flour component by weight of dry ingredient, said flour component having a fat content of 15% to 33% and which contains 25% of 70% by dry weight of maize flour and 30% to 75% of gluten free full-fat soya flour;
    c) 0.1% to 5% gelling agent; and
    d) an enzyme additive comprising alpha amylase and optionally an egg component; an emulsifier; a reducing sugar; ammonium bicarbonate; a pH adjuster; and a thickener.

12. A microwave cookable or reheatable foodstuff coating composition of claim 1 wherein the composition consists of:
    55-80 weight % water and 20-45 weight % of a mixture comprising by dry weight:
    an aqueous mixture including:
    a) from about 20%-28.8% high amylose starch by weight of dry ingredients;
    b) 40-55% of a flour component by weight of dry ingredient, said flour component having a fat content of 15% to 33% and which contains 25% of 70% by dry weight of maize flour and 30% to 75% of gluten free full-fat soya flour;
    c) 0.1% to 5% guar gum; and
    d) an enzyme additive comprising alpha amylase.

13. The microwave cookable or reheatable foodstuff of claim 11, wherein the flour component comprises maize flour and full-fat soya flour and the flour component has a fat content of from 15% to 33%.

14. The microwave cookable or reheatable foodstuff of claim 13, wherein the flour component has a fat content of from 20-28%.

15. The microwave cookable or reheatable foodstuff of claim 11, wherein the gelling agent is guar gum.

16. The microwave cookable or reheatable foodstuff of claim 13, wherein the gelling agent is guar gum.

* * * * *

UNITED STATES PATENT AND TRADEMARK OFFICE
CERTIFICATE OF CORRECTION

PATENT NO. : 9,332,767 B2
APPLICATION NO. : 14/032881
DATED : May 10, 2016
INVENTOR(S) : Pickford It is certified that error appears in the above-identified patent and that said Letters Patent is hereby corrected as shown below:

In the specification:

Col. 1, line 45, "flavours" should be – flavors –

Col. 2, line 3, after "20-35%" insert -- , --

Col. 2, line 11, after "55%" insert -- , --

Col. 2, line 32, "colour" should be – color –

Col. 2, line 34, after "1-3%" insert -- , --

Col. 2, line 38, "stabilise" should be – stabilize –

Col. 2, line 44, after "3%" insert -- , --

Col. 3, line 5, "a" should be – as –

Col. 3, lines 23-24, "flavours" should be – flavors –

Col. 3, lines 26, 27, "cp" should be – cP –

Col. 3, line 28, "No" should be – No. –

Col. 3, line 31, "cp" should be – cP –

Col. 3, line 31, after "cp" insert -- , --

Col. 3, line 67, after "sense" insert -- . --

Col. 4, line 29, "liter" should be – litre –

Col. 4, line 53, "stabiliser" should be – stabilizer –

Signed and Sealed this
Ninth Day of August, 2016

Michelle K. Lee
*Director of the United States Patent and Trademark Office*

CERTIFICATE OF CORRECTION (continued)
U.S. Pat. No. 9,332,767 B2

Col. 4, line 57, after "gel" insert -- : --

Col. 5, line 2, "stabilising" should be – stabilizing –

Col. 5, lines 16, 22, 32, "Stabiliser" should be – Stabilizer –
  "stabiliser" should be – stabilizer –

Col. 5, line 42, "Stabiliser" should be – Stabilizer –

Col. 5, line 61, "stabiliser" should be – stabilizer –

Col. 5, line 62, "following" should be – followed –

Col. 5, line 63, "colourless, solid flavouring" should be – colorless, solid flavoring –

Col. 6, lines 14, 29, "stabiliser" should be – stabilizer –

In the claims:

Col. 7, claim 1, line 33, "an aqueous mixture including:" should be a new paragraph Col. 7, claim 3, line 47, after "1" insert -- , --

Col. 7, claim 5, line 53, after "1" insert -- , --

Col. 8, claim 9, line 6, "a bout" should be – about –

Col. 8, claim 12, line 33, after "1" insert -- , --

Col. 8, claim 12, lines 39-40, "ingredient" should be – ingredients –